United States Patent
Han et al.

(10) Patent No.: US 8,934,908 B2
(45) Date of Patent: Jan. 13, 2015

(54) METHOD AND USER EQUIPMENT FOR REPORTING HANDOVER SCENARIO JUDGMENT PARAMETER AND BASE STATION FOR HANDOVER SCENARIO JUDGMENT

(75) Inventors: Lifeng Han, Shenzhen (CN); Feng He, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 117 days.

(21) Appl. No.: 13/637,027

(22) PCT Filed: Jun. 28, 2011

(86) PCT No.: PCT/CN2011/076520
§ 371 (c)(1),
(2), (4) Date: Sep. 25, 2012

(87) PCT Pub. No.: WO2012/000430
PCT Pub. Date: Jan. 5, 2012

(65) Prior Publication Data
US 2013/0017834 A1  Jan. 17, 2013

(30) Foreign Application Priority Data
Jun. 28, 2010  (CN) .......................... 2010 1 0210988

(51) Int. Cl.
*H04W 36/00* (2009.01)
*H04W 8/26* (2009.01)
*H04W 28/04* (2009.01)
*H04W 88/08* (2009.01)

(52) U.S. Cl.
CPC ............ *H04W 36/0083* (2013.01); *H04W 8/26* (2013.01); *H04W 28/04* (2013.01); *H04W 88/08* (2013.01)
USPC .......................................... 455/437; 370/331

(58) Field of Classification Search
CPC ... H04W 36/0083; H04W 8/26; H04W 88/08; H04W 28/04
See application file for complete search history.

(56) References Cited

U.S. PATENT DOCUMENTS

2009/0316652 A1  12/2009  Agashe
2010/0113033 A1  5/2010  Qiu
(Continued)

FOREIGN PATENT DOCUMENTS

CN  101009921 A  8/2007
CN  101317482 A  12/2008
(Continued)

OTHER PUBLICATIONS

3GPP TSG RAN WG3 Meeting #64 R3-091357, May 4-8, 2009.*
(Continued)

*Primary Examiner* — Vladimir Magloire
*Assistant Examiner* — Erica Navar
(74) *Attorney, Agent, or Firm* — Oppedahl Patent Law Firm LLC

(57) ABSTRACT

The disclosure provides a method and user equipment for reporting a handover scenario judgment parameter and a base station for a handover scenario judgment; the method includes: an uplink message transmitted by the User Equipment (UE) includes an Evolved Cell Global Identifier (ECGI) so that a network side performs a handover scenario judgment based on the ECGI, wherein the uplink message is a message that includes Radio Link Failure (RLF)-related measurement information, or the uplink message is a message that includes an indication of RLF-related measurement information. Therefore, the disclosure enables an accurate handover scenario judgment, thus avoiding the problem in the related art that the error rate of a handover scenario judgment is high.

14 Claims, 4 Drawing Sheets

(56) References Cited

U.S. PATENT DOCUMENTS

| | | |
|---|---|---|
| 2010/0130199 A1 | 5/2010 | Piercy |
| 2011/0014921 A1 | 1/2011 | Neil |
| 2011/0077010 A1* | 3/2011 | Xu et al. ................ 455/437 |
| 2011/0151878 A1 | 6/2011 | Xu |

FOREIGN PATENT DOCUMENTS

| | | |
|---|---|---|
| CN | 101374321 A | 2/2009 |
| CN | 101656990 A | 2/2010 |
| JP | 2009501471 A | 1/2009 |
| JP | 2011526458 A | 10/2011 |
| JP | 2011530912 A | 12/2011 |
| JP | 2012514948 A | 6/2012 |
| WO | 2009060935 A1 | 5/2009 |
| WO | 2009086991 A1 | 7/2009 |
| WO | 2010008857 A2 | 1/2010 |

OTHER PUBLICATIONS

International Search Report in international application No. PCT/CN2011/076520, mailed on Oct. 13, 2011.

English Translation of the Written Opinion of the International Search Authority in international application No. PCT/CN2011/076520, mailed on Oct. 13, 2011.

3GPP TSG RAN WG2 Meeting #63, RLF Analysis R2-084304, Huawei, Korea, Aug. 18, 2008, 3 total pages.

3GPP TR 36.902 v9.1.0, 3rd Generation Partnership Project; Technical Specification Group Radio Access Network; Evolved Universal Terrestrial Radio Access Network (E-ITRAN); Self-configuring and self-optimizing network (SON) use cases and solutions (Release 9), Mar. 2010, 24 total pages.

3GPP TS 36.300 V10.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Jun. 18, 2010.

3GPP TSG RAN2 Meeting #66bis, Target cell parameters for inbound handover, NEC, Los Angles, Jun. 22, 2009.

3GPP TSG-RAN WG3 AdHoc, Facilitating Routing of Relay Inbound Handover, Ericsson, Beijing, Jun. 23, 2010.

3GPP TSG RAN WG3 Meeting #64, RLF Reports for Mobility Robustness Optimization, R3-091357, Nokia Siemens Networks, San Francisco, May 4, 2009.

* cited by examiner

(12)  United States Patent

METHOD AND USER EQUIPMENT FOR REPORTING HANDOVER SCENARIO JUDGMENT PARAMETER AND BASE STATION FOR HANDOVER SCENARIO JUDGMENT

TECHNICAL FIELD

The present disclosure relates to a cellular wireless communication system, and in particular to a method and user equipment (UE) for reporting a handover scenario judgment parameter and a base station for a handover scenario judgment in a Long Term Evolution (LTE) mobile communication system.

BACKGROUND

An LTE network consists of an Evolved Universal Terrestrial Radio Access Network (E-UTRAN) Evolved NodeB (eNB) and an Evolved Packet Core (EPC), so as to realize the flatting of network. The EUTRAN includes a set of eNBs which are connected with the EPC through an S1 interface; the eNBs are connected to each other through X2 interfaces; and the S1 interface and the X2 interface are both logical interfaces. An EPC can manage one or more eNBs, one eNB can also be controlled by multiple EPCs, and one eNB can manage one or more cells.

An Self-organized Network (SON) is a technology that automatically configures and optimizes a network. The SON technology is featured by self-organization and self-optimization; the application of the SON technology in the LTE enables an eNB to automatically configure a network parameter according to a certain measurement and perform automatic optimization according to a network change, thereby keeping the performance of network optimum, and saving a lot of manpower and resources.

For the self-optimization of a handover parameter of the LTE system, it is needed to optimize cell selection and a handover-related parameter by a certain algorithm, according to the network operation state and the handover-related measurement, so as to improve the network performance. The above-mentioned handover is a handover in the LTE system or among systems, wherein the handover among systems is a handover to a Universal Terrestrial Radio Access Network (UTRAN) or a Global System for Mobile Communication (GSM) or a Code Division Multiple Access (CDMA) system. A process that UE performs a handover in a network is that: a network side makes a handover decision based on a handover algorithm and according to the signal quality of a local cell where the UE is and that of a neighboring cell which are reported by the UE, and then notifies the UE to execute a specific handover. A ping-pong handover, handover failure or Radio Link Failure (RLF), all of which are not expected, may be caused by improper handover parameter setting, have a negative impact on user experience and waste network resources. Therefore, for the self-optimization of a handover parameter, an accurate judgment on handover failure or undesirable handover scenario is the basis of an adjustment to the handover parameter.

The RLF happens to UE when the radio link signal quality is very bad or a handover is failed, and the UE performs Radio Resource Control (RRC) re-setup. When the UE performs the RRC re-setup, a target cell is obtained through cell selection. when the handover failure happens in the handover process, a source base station or a target base station retains information of a user, for the RRC re-setup. The UE includes a User Equipment Identity (UE-Identity) in an RRC re-setup request message, including a Cell Radio Network Temporary Identifier (C-RNTI) of the UE in a cell, short Medium Access Control MAC integrity protection (short MAC-I) and a Physical Cell Identity (PCI). Wherein the C-RNTI is allocated in a source cell (aiming at a handover failure scenario), or allocated in a cell triggering the RRC re-setup (aiming at other scenarios except the handover failure scenario); the PCI is the physical address of the source cell (aiming at the handover failure scenario), or the physical address of the cell triggering the RRC re-setup (aiming at other scenarios except the handover failure scenario); and the short MAC-I is calculated by adopting the KRRCint key of the source cell (aiming at the handover failure scenario) or of the cell triggering the RRC re-setup and an integrity protection algorithm, and what is input is the PCI, the C-RNTI and an Evolved Cell Global Identifier (ECGI), wherein the PCI and the C-RNTI are included in an RRC re-setup message, and the ECGI is the one of the target cell selected by the UE during RRC re-setup.

As shown in FIG. 1, a too late handover scenario may be: RLF happens to UE in Cell b of eNB B, or the UE has failure in a handover from Cell b to Cell a, and then the UE attempts RRC re-setup in the Cell a of eNB A; what is said above shows that the UE performs a too late handover from the Cell b to the Cell a.

As shown in FIG. 2, a judgment on a too early handover scenario may be: RLF happens to UE in the Cell b soon after the UE performs a handover from Cell a of eNB A to Cell b of eNB B, or the UE has failure in a handover from the Cell a to the Cell b, and then the UE selects to perform RRC re-setup in the Cell a, namely, it returns back to the cell where the UE resides before the handover to perform the RRC re-setup; what is said above shows that the UE performs a too early handover from the Cell a to the Cell b.

As shown in FIG. 3, a scenario of a handover to a wrong cell may be: RLF happens soon after UE performs a handover from Cell c of eNB C to Cell b of eNB B, or the UE has failure in a handover from the Cell c to the Cell b, and then the UE performs RRC re-setup in the Cell a of the eNB A; what is said above shows that the selected Cell b of the eNB B is a wrong target cell, and the right target cell is the Cell a, namely, the UE should directly perform a handover from the Cell c to the Cell a.

During an RRC re-setup process, when the target eNB selected for re-setup does not have UE context, the RRC re-setup process would be failed, and the UE turns to an idle state. As shown in FIG. 4, RLF happens in Cell 2, UE initiates RRC re-setup attempt in Cell 1 and turns to an idle state after the RRC re-setup attempt is failed; the UE selects Cell 3 and performs RRC setup successfully. Thus the UE can enable an RRC setup complete message transmitted in the Cell 3 to include the contents of PCI, C-RNTI and short MAC-I which are formed during the first RRC re-setup, and the PCI of the target Cell 1 of the RRC re-setup attempt, and further include an indication of RLF-related measurement information. The RLF-related measurement information is the measurement results of signal quality of a serving cell and the best neighboring cell before the happening of RLF, wherein the measurement results are recorded by the UE; the measurement information can also include the measurement results of signal quality of a serving cell and the best neighboring cell, which are measured by the UE when initiating re-setup subsequently, or can also include position information of the UE.

As shown in FIG. 4, a method 1 of a handover scenario judgment is that: after receiving an RRC re-setup request message from the UE, base station 1 sends an RLF indication message to base station 2, and then the base station 2 judges whether it is a too early handover, a too late handover or a handover to a wrong cell according to the RLF indication message; after receiving an RRC setup complete message from the UE, the base station 3 initiates a request for obtaining RLF-related measurement information to the UE according to an indication of RLF-related measurement information, and the UE reports the RLF-related measurement information; the base station 3 sends obtained RLF-related measurement information and UE identity information to the base station 1, then the base station 1 sends the received information as the second part of the RLF indication message to the base station 2, and the base station 2 judges whether it is a covering problem according to the RLF-related measurement information.

As shown in FIG. 5, a method 2 of a handover scenario judgment is that: the base station 3 directly sends the obtained RLF-related measurement information and the UE identity information, which include the time difference between the last handover and the first RRC re-setup attempt, to the base station 2, then the base station 2 judges whether it is a handover problem or a covering problem; when it is the former, a specific handover scenario judgment is made, such as a too late handover, a too early handover and a handover to a wrong cell, according to the time difference between the last handover and the first RRC re-setup attempt.

In the judgment method 1 above, the base station 3 sends the RLF indication message only according to the PCI information of the Cell 1 in the RRC setup complete message, and the RLF indication message may be transmitted to a wrong eNB due to PCI aliasing. In the judgment method 2 above, due to the PCI aliasing, the base station 2 may map a wrong cell according to the PCI information of the Cell 1. To sum up, in the related art, a judgment is performed based on PCI, the PCI of a target cell is an identity of a physical layer, and different target cells are usually allocated with the same PCI when neighboring cell information of UE is allocated, thus causing PCI aliasing of target cells, thereby being incapable of uniquely determining the right target cell, and resulting in a high error rate of a handover scenario judgment.

SUMMARY

On that account, the present disclosure mainly aims to provide a method and UE for reporting a handover scenario judgment parameter and a base station for a handover scenario judgment, which enables an accurate handover scenario judgment, thus avoiding the problem in the related art that the error rate of a handover scenario judgment is high.

For achieving the above aim, the technical solution of the present disclosure is realized as follows.

The present disclosure provides a method for a handover scenario judgment, including: including an Evolved Cell Global Identifier (ECGI) in an uplink message transmitted by UE so that a network side makes a handover scenario judgment based on the ECGI; wherein the uplink message is a message that includes Radio Link Failure (RLF)-related measurement information, or the uplink message is a message that includes an indication of RLF-related measurement information.

In the method above, when the message that includes RLF-related measurement information is a UE information response (UEInformationResponse) message, or the message that includes an indication of RLF-related measurement information is an RRC setup complete (RRCsetupcomplete) message, the ECGI may be an ECGI of a cell where the UE attempts first RRC re-setup;

the judgment may include: performing a handover scenario judgment based on the ECGI of the cell where the UE attempts the first RRC re-setup.

In the method above, the judgment may further include: making a judgment on sending of an RLF indication message based on the ECGI of the cell where the UE attempts the first RRC re-setup Furthermore, when the message that includes RLF-related measurement information is a UEInformationResponse message, or the message that includes an indication of RLF-related measurement information is an RRCsetupcomplete message, the ECGI may be an ECGI of a cell where the UE stayed prior to entering a cell where RLF happens;

the judgment may include: making a handover scenario judgment based on the ECGI of the cell where the UE stayed prior to entering the cell where RLF happens.

The method above may further include: including the ECGI of the cell where the UE attempts the first RRC re-setup and/or the ECGI of the cell where the UE stayed prior to entering the cell where RLF happens in an RLF indication message transmitted between base stations;

wherein the transmission between the base stations is that the message is transmitted from a base station which receives the RLF-related measurement information of UE to a base station to which a serving cell where the UE stayed before happening of RLF belongs.

In the method above, the step that the network side makes a handover scenario judgment based on the ECGI may include:

when a timer of UE context indicates a value smaller than a time difference reported by the UE, then judging this handover to be a too late handover scenario; when the timer of the UE context indicates a value larger than the time difference reported by the UE, and a source cell where the UE performs a handover last time is a cell where the UE performs RRC re-setup, then judging this handover to be a too early handover scenario; and when the timer of the UE context indicates a value larger than the time difference reported by the UE, and the source cell where the UE performs a handover last time is other cell, then judging this handover to be one to a wrong cell;

wherein the timer of the UE context is on the network side, and provides a time threshold for the handover scenario judgment; and the time difference reported by the UE is a time difference between the UE performs a handover to Cell 2 and the UE attempts to initiate an RRC re-setup request in Cell 1.

In addition, the disclosure further provides a method for reporting a handover scenario judgment parameter by UE, wherein after radio link failure happens in Cell 2 and UE has failure in RRC re-setup in Cell 1, the UE initiates RRC setup in Cell 3 successfully; the method includes:

including Evolved Cell Global Identifiers (ECGIs) of the Cell 1 and the Cell 2, a time difference between the UE performs a handover to the Cell 2 and the UE initiates an RRC re-setup request in the Cell 1, and/or an ECGI of a cell where the UE stayed prior to entering the Cell 2 in an uplink message transmitted by the UE to a base station where the Cell 3 belongs; wherein the uplink message is a message that includes Radio Link Failure (RLF)-related measurement information, or the uplink message is a message that includes an indication of RLF-related measurement information.

In the method above, the base station to which the Cell 3 belongs may transmit received information reported by the UE to a base station to which the Cell 2 belongs.

Furthermore, the base station to which the Cell 2 belongs may compare a value of a timer of UE context with the time difference between the UE performs a handover to the Cell 2 and the UE initiates an RRC re-setup request in the Cell 1;

when the timer of the UE context indicates a value smaller than the time difference, then judging this handover to be a too late handover scenario; when the timer of the UE context indicates a value larger than the time difference, and a source cell where the UE performs a handover last time is a cell where the UE performs RRC re-setup, then judging this handover to be a too early handover scenario; and when the timer of the UE context indicates a value larger than the time difference, and the source cell where the UE performs a handover last time is other cell, then judging this handover to be one to a wrong cell; wherein the timer of the UE context is on a network side, and provides a time threshold for a handover scenario judgment.

Furthermore, the base station to which the Cell 3 belongs may send a UE information request (UEInformationRequest) message to request the UE to report the RLF-related measurement information; and the UE may report a handover judgment parameter through a UE information response (UEInformationResponse) message.

Correspondingly, the present disclosure further provides UE for reporting a handover scenario judgment parameter, including:

a collecting unit, which is configured to collect an uplink message; and a reporting unit, which is configured to report an uplink message including an ECGI to a base station on a network side;

wherein the uplink message is a message that includes RLF-related measurement information, or a message that includes an indication of RLF-related measurement information.

The above-mentioned UE may be further configured to: after Radio Link Failure (RLF) happens to the UE in Cell 2 and the UE has failure in RRC re-setup in Cell 1, initiate RRC setup in Cell 3 successfully, and include Evolved Cell Global Identifiers (ECGIs) of the Cell 1 and the Cell 2, a time difference between the UE performs a handover to the Cell 2 and the UE initiates an RRC re-setup request in the Cell 1, and/or an ECGI of a cell where the UE stayed prior to entering the Cell 2 in an uplink message transmitted by the UE to a base station where the Cell 3 belongs.

In addition, the disclosure further provides a base station for a handover scenario judgment, including:

a judging unit, which is configured to make a handover scenario judgment according to an uplink message that is reported by UE and includes an Evolved Cell Global Identifier (ECGI); wherein the uplink message is a message that includes Radio Link Failure (RLF)-related measurement information, or the uplink message is a message that includes an indication of RLF-related measurement information.

In the base station, the judging unit may be further configured, when the message that includes RLF-related measurement information is a UE information response (UEInformationResponse) message or the message that includes an indication of RLF-related measurement information is a Radio Resource Control (RRC) setup complete (RRCsetupcomplete) message, as well as the ECGI is an ECGI of a cell where the UE attempts first RRC re-setup, to make the handover scenario judgment based on the ECGI of the cell where the UE attempts the first RRC re-setup.

In the base station, the judging unit may be further configured to make a judgment on sending of an RLF indication message based on the ECGI of the cell where the UE attempts the first RRC re-setup.

In the base station, the judging unit may be further configured, when the message that includes RLF-related measurement information is a UEInformationResponse message or the message that includes an indication of RLF-related measurement information is an RRCsetupcomplete message, as well as the ECGI is an ECGI of a cell where the UE stayed prior to entering a cell where RLF happens, to make the handover scenario judgment based on the ECGI of the cell where the UE stayed prior to entering the cell where RLF happens.

The base station may further include: a transmission unit configured to include an ECGI of a cell where the UE attempts first RRC re-setup and/or an ECGI of a cell where the UE stayed prior to entering a cell where RLF happens in an RLF indication message transmitted between base stations; wherein the transmission between the base stations is that the message is transmitted from a base station which receives the RLF-related measurement information of the UE to a base station to which a serving cell where the UE stayed before happening of RLF belongs.

In the base station above, the judging unit may be further configured to: when a timer of UE context indicates a value smaller than a time difference reported by the UE, then judge this handover to be a too late handover scenario; when the timer of the UE context indicates a value larger than the time difference reported by the UE, and a source cell where the UE performs a handover last time is a cell where the UE performs RRC re-setup, then judge this handover to be a too early handover scenario; and when the timer of the UE context indicates a value larger than the time difference reported by the UE, and the source cell where the UE performs a handover last time is other cell, then judge this handover to be one to a wrong cell;

wherein the timer of the UE context is on a network side, and provides a time threshold for the handover scenario judgment; and the time difference reported by the UE is a time difference between the UE performs a handover to Cell 2 and the UE attempts to initiate an RRC re-setup request in Cell 1.

Compared with the related art, the disclosure has the following advantages:

an uplink message transmitted by UE includes an ECGI so that a network side makes a handover scenario judgment based on the ECGI, wherein the uplink message is a message that includes RLF-related measurement information, or the uplink message is a message that includes an indication of RLF-related measurement information.

In addition, the judgment is performed based on the ECGI, and the ECGI is an identifier of layer 3, which is unique when the UE allocates neighboring cell information, therefore, by applying the present disclosure, a target cell can be uniquely determined, an accurate handover scenario judgment can be made, and the problem in the related art that the error rate of the handover scenario judgment is high can be avoided.

DETAILED DESCRIPTION

The basic idea of the present disclosure is that: UE includes an ECGI in an uplink message transmitted by the UE so that a network side makes a handover scenario judgment based on the ECGI, wherein the uplink message can be a message that includes RLF-related measurement information, or the uplink message can be a message that includes an indication of RLF-related measurement information.

Implementation of the technical solution is described below with reference to the accompanying drawings in detail.

The disclosure is a solution for a handover scenario judgment; aiming at the above described problems of the two judgment methods in the related art, the application of the present disclosure can solve the problem that an RLF indication message of base station 3 is transmitted wrongly and the problem that base station 2 may map a wrong cell according to PCI information of Cell 1 because in the present disclosure, a judgment is made not based on PCI as the related art, but based on an ECGI, and the ECGI is an identifier of layer 3 which is unique when UE allocates neighboring cell information and by which a target cell can be uniquely determined. The disclosure enables an accurate handover scenario judgment, thus avoiding the problem in the related art that the error rate of a handover scenario judgment is high, i.e., avoiding an undesirable handover, not causing a negative impact on user experience and saving network resources. Besides, it is extremely beneficial for the subsequent operation of the handover scenario judgment, for example, for handover-parameter self-optimization, because an adjustment to handover-parameter self-optimization is performed based on an accurate judgment on handover failure or an undesirable handover scenario.

Figure 6:
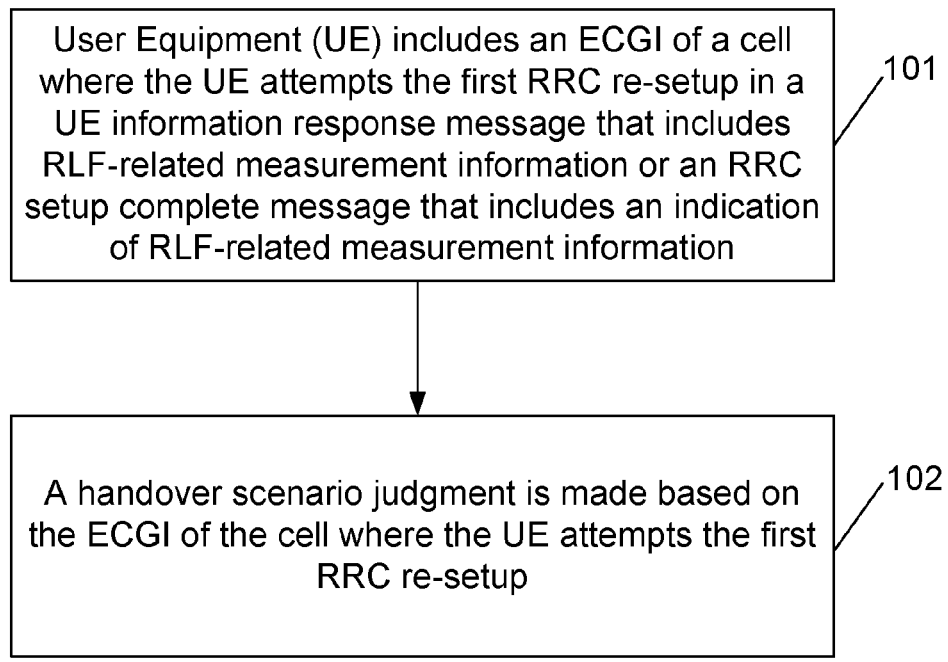
FIG. 6 shows a flowchart of an embodiment of a method in the present disclosure.

A method for a handover scenario judgment, mainly comprising the following:

as shown in FIG. 6, a judgment method according to an embodiment comprises the following steps:

101: taking an LTE system as an example, in the LTE system, UE includes an ECGI of a cell where the UE attempts the first RRC re-setup in a UEInformationResponse message that includes RLF-related measurement information or in an RRCsetupcomplete message that includes an indication of RLF-related measurement information, when the UE transmits the UEInformationResponse message or the RRCsetupcomplete message; and

102: a network side makes a handover scenario judgment based on the ECGI of the cell where the UE attempts the first RRC re-setup.

Here, a right target cell can be indexed uniquely when the handover scenario judgment is made based on the ECGI of the cell where the UE attempts the first RRC re-setup, thereby target cell aliasing caused by the use of PCI in the related art can be avoided, wherein the target cell aliasing makes it impossible to index the right target cell.

Furthermore, an RLF indication message transmitted between base stations also includes the ECGI of the cell where the first RRC re-setup is attempted, which is used for uniquely determining the target cell when the handover scenario judgment is made. The ECGI can also be used for verifying UE context. The mentioned transmission between the base stations is that the message is transmitted from the base station which receives the RLF-related measurement information of the UE to the base station where a serving cell where the UE stayed before the happening of RLF belongs.

Furthermore, the method may also include: including an ECGI of a cell where the UE stayed prior to entering a cell where RLF happens in the UEInformationResponse message or in the RRCsetupcomplete message. Thus, it is possible to perform a handover from a source cell to a specified right target cell when a judgment is made based on the ECGI of the cell where the UE stayed prior to entering the cell where RLF happens.

Furthermore, the RLF indication message transmitted between the base stations can also include the ECGI of the cell where the UE stayed prior to entering the cell where RLF happens. The above is just to indicate that a message including the ECGI of the cell where the UE stayed prior to entering the cell where RLF happens can also be transmitted between the base stations.

Through the disclosure, the problem that an RLF indication message of a base station which receives an RRC setup message is transmitted to a wrong target base station when a handover scenario judgment is made can be avoided, and the base station making the handover scenario judgment can obtain a source cell in handover processes in which a too early handover and a handover to a wrong cell happen.

The present disclosure is described below with examples.

Through the present disclosure, a base station can uniquely determine a cell where RLF happens, and a target base station can determine which handover scenario it is according to RLF-related information; on that basis, a network can realize optimization of a specific handover parameter, thereby realizing the self-optimization function of the network and improving the performance of the network. The RLF-related measurement information in the present disclosure is one or more items selected from the following pieces of information: measurement results of signal quality of the serving cell and the best neighboring cell before the happening of RLF, measurement results of signal quality of the serving cell and the best neighboring cell which are measured by UE when initiating re-setup subsequently, and position information of the UE.

Figure 1:
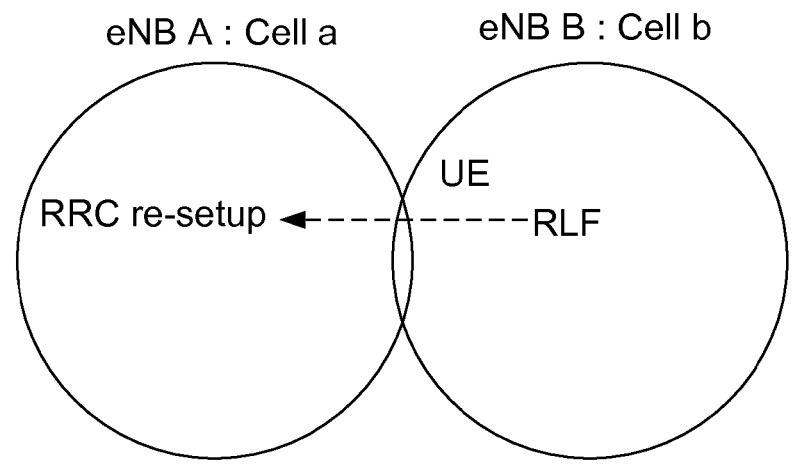
FIG. 1 shows a state diagram of a too late handover from Cell b to Cell a performed by UE.
Figure 2:
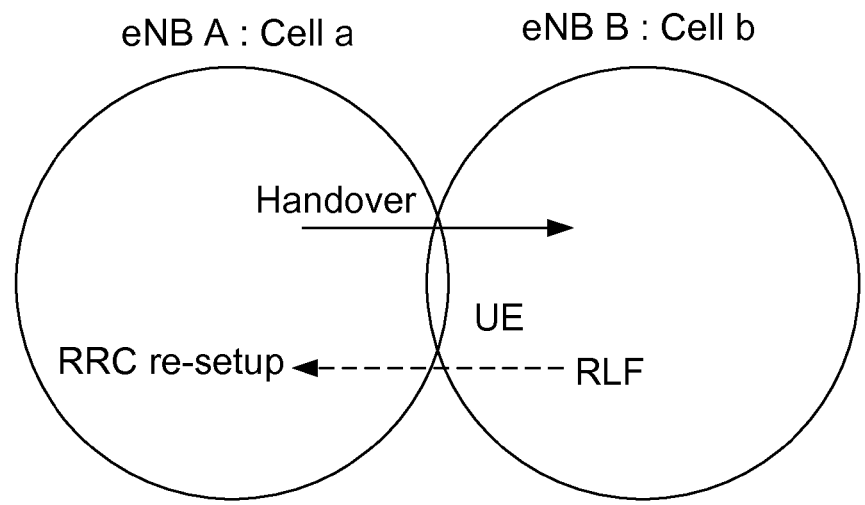
FIG. 2 shows a state diagram of a too early handover from Cell a to Cell b performed by UE.
Figure 3:
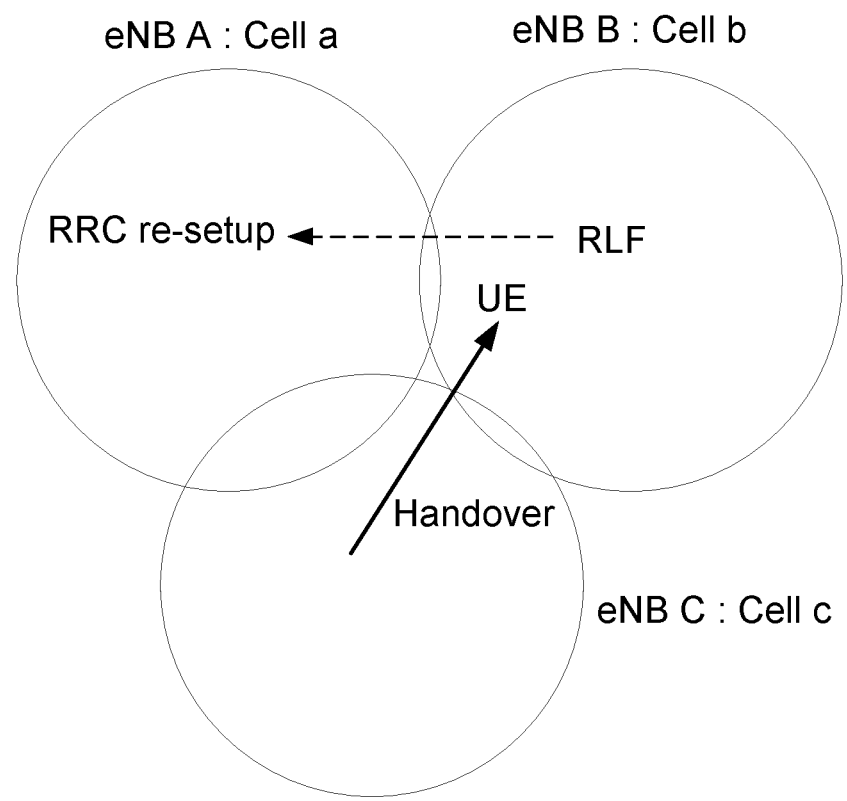
FIG. 3 shows a state diagram of a handover from Cell c to Cell b performed by UE, during which the UE selects a wrong cell.
Figure 4:
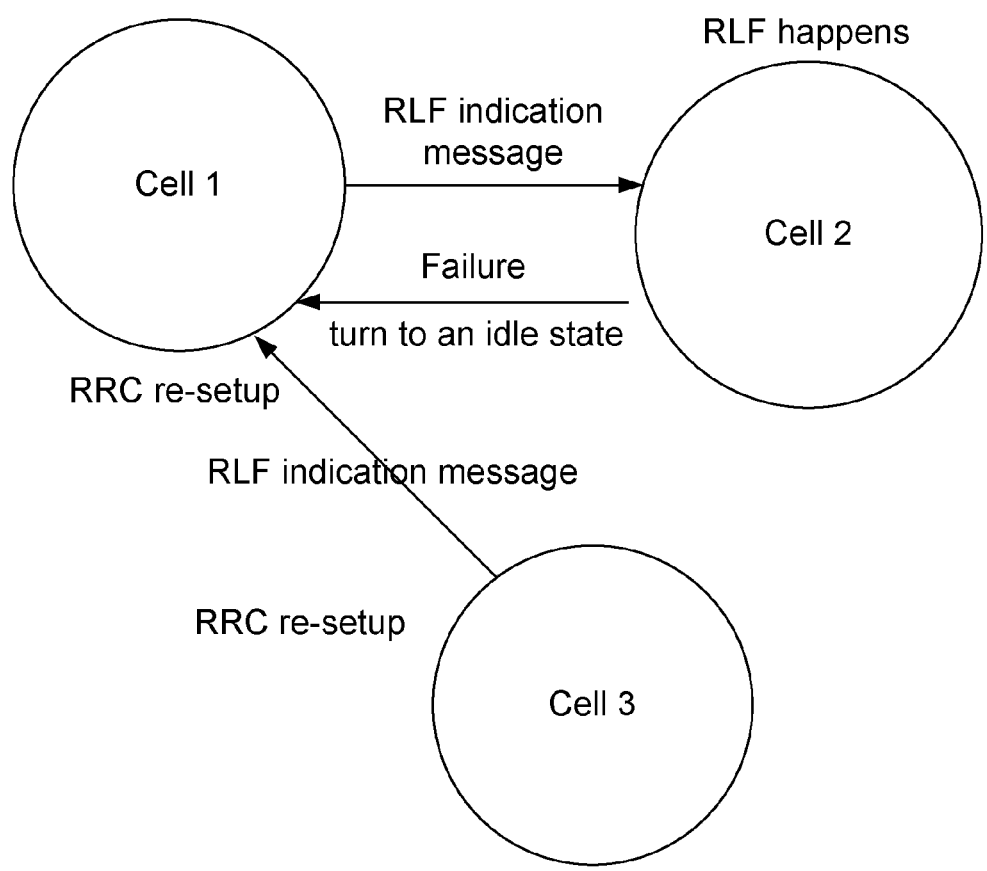
FIG. 4 shows a state diagram of judgment method 1.

Embodiment 1:

A method 1 of a handover scenario judgment is adopted, and an RRC setup complete message includes the ECGI of the Cell 1. With reference to the state diagram shown in FIG. 4, the embodiment 1 is described as follows:

1) UE is in connection state in the Cell 2 of the base station 2, RLF happens due to very bad radio link signal quality, handover failure or other reasons; the UE selects to perform RRC re-setup in the Cell 1, and sends an RRC re-setup request message to the base station 1; since there is no UE context in the Cell 1, the RRC re-setup performed by the UE in the Cell 1 is failed, and then the UE turns to an idle state; the UE in the idle state selects the Cell 3 through cell selection, sends an RRC setup request message to the base station 3, and initiates an RRC setup request in the Cell 3; then the UE performs RRC setup successfully and turns to the connection state;

2) after receiving the RRC re-setup request message from the UE, the base station 1 sends an RLF indication message to the base station 2 to indicate that the RLF happens to the UE, wherein the RLF indication message includes the C-RNTI and the PCI which are included in the RRC re-setup request message from the UE, and the ECGI of the Cell 1 which is selected by the UE to attempt the RRC re-setup, and it may also include short MAC-I;

3) after receiving the RLF indication message, the base station 2 obtains specific UE context by matching according to the C-RNTI and the PCI included therein; furthermore, the UE context can be verified through the short MAC-I; the base station 2 can judge a specific handover scenario according to the timer of the UE context and the last handover process of the UE; for example, when the timer of the UE context times out, then judging this handover from the Cell 2 to the Cell 1 to be a too late handover; when the timer of the UE context does not time out, and the source cell where the UE performs a handover last time is the Cell 1, then judging this handover from the Cell 1 to the Cell 2 to be a too early handover; when the timer of the UE context does not time out, and the source cell where the UE performs a handover last time is other cell, then judging this handover from the other cell to the Cell 2 to be a handover to a wrong cell;

4) the base station 3 receives the RRC setup complete message from the UE, wherein the RRC setup complete message can also include an indication indicating that the UE stores RLF-related measurement information, and the ECGI of the Cell 1 where the UE attempts RRC re-setup for the first time after the RLF, besides PCI, C-RNTI and short MAC-I in the RRC re-setup request message transmitted by the UE in the Cell 1; the base station 3 sends a UEInformationRequest message to the UE to request it to report the RLF-related measurement information, and then the UE reports the RLF-related measurement information to the base station 3 through a UEInformationResponse message; the base station 3 obtains a unique ECGI of the base station 1 through the ECGI of the Cell 1, and sends an RLF indication message to the base station 1, wherein the RLF indication message here includes the C-RNTI and PCI in the RRC setup complete message, it can also include the short MAC-I, the ECGI of the Cell 1, the RLF-related measurement information reported by the UE and an identifier which indicates that it is the second part of the RLF indication; and 5) after receiving the RLF indication message transmitted from the base station 3, the base station 1 utilizes one or more items selected from the C-RNTI and PCI, the MAC-I, and the ECGI of the Cell 1 included in the RLF indication message to perform verification, so as to confirm whether this RLF indication message is the second part of the RLF indication that is transmitted from the base station 1 to the base station 2, for example, confirming that it is the same UE by verification; if so, the RLF indication message, as the second part of the RLF indication that is transmitted from the base station 1 to the base station 2, is transmitted to the base station 2; after receiving the second RLF indication message, the base station 2 judges whether it is a handover parameter problem or a covering problem according to the RLF-related measurement information included therein; for example, when the signal quality of both a serving cell and the best neighboring cell is poor, it indicates there may be a coverage hole existing.

Furthermore, the base station 3 can send the RLF indication message to the base station 2 through the PCI information, which the UE includes in the RRC re-setup request message, in the RRC setup complete message. After receiving the second RLF indication message, the base station 2 obtains UE context by matching according to the PCI and the C-RNTI, and the UE context can be verified through the short MAC-I, and further through the ECGI of the Cell 1. When the UE context is consistent with that in the RLF indication message received before, then the base station 2 regards the received second RLF indication message as the second part of RLF indication messages. The base station 2 judges whether it is a handover parameter problem or a covering problem according to the RLF-related measurement information in the RLF indication message. For example, when the signal quality of both a serving cell and the best neighboring cell is poor, it indicates there may be a coverage hole existing.

Embodiment 2:

The method 1 of a handover scenario judgment is adopted, and a UEInformationResponse message includes the ECGI of the Cell 1. With reference to the state diagram shown in FIG. 4, the embodiment 2 is described as follows:

1) UE is in connection state in the Cell 2 of the base station 2, RLF happens due to very bad radio link signal quality, handover failure or other reasons; the UE selects to perform RRC re-setup in the Cell 1, and sends an RRC re-setup request message to the base station 1; since there is no UE context in the Cell 1, the RRC re-setup performed by the UE in the Cell 1 is failed, and then the UE turns to an idle state; the UE in the idle state selects the Cell 3 through cell selection, sends an RRC setup request message to the base station 3, and initiates an RRC setup request in the Cell 3; then the UE performs RRC setup successfully and turns to the connection state;

2) after receiving the RRC re-setup request message from the UE, the base station 1 sends an RLF indication message to the base station 2 to indicate that the RLF happens to the UE, wherein the RLF indication message includes the C-RNTI and the PCI included in the RRC re-setup request message from the UE, and the ECGI of the Cell 1 which is selected by the UE to attempt the RRC re-setup, and it may also include short MAC-I;

3) after receiving the RLF indication message, the base station 2 obtains specific UE context by matching according to the C-RNTI and the PCI included therein; furthermore, the UE context can be verified through the short MAC-I; the base station 2 can judge a specific handover scenario according to the timer of the UE context and the last handover process of the UE; for example, when the timer of the UE context times out, then judging this handover from the Cell 2 to the Cell 1 to be a too late handover; when the timer of the UE context does not time out, and the source cell where the UE performs a handover last time is the Cell 1, then judging this handover from the Cell 1 to the Cell 2 to be a too early handover; when the timer of the UE context does not time out, and the source cell where the UE performs a handover last time is other cell, then judging this handover from the other cell to the Cell 2 to be a handover to a wrong cell;

4) the base station 3 receives the RRC setup complete message, which includes an indication indicating that the UE stores RLF-related measurement information, from the UE; the base station 3 sends a UEInformationRequest message to the UE to request it to report the RLF-related measurement information, and then the UE reports the RLF-related measurement information to the base station 3 through a UEInformationResponse message, wherein the UEInformationResponse message can also include the PCI and C-RNTI included in the RRC re-setup request message transmitted by the UE in the Cell 1, the short MAC-I, and the ECGI of the Cell 1 where the UE attempts RRC re-setup for the first time after the RLF; the base station 3 obtains a unique ECGI of the base station 1 through the ECGI of the Cell 1, and sends an RLF indication message to the base station 1, wherein the RLF indication message here includes the C-RNTI and PCI included in the RRC setup complete message, it can also include the short MAC-I, the ECGI of the Cell 1 which is selected by the UE to attempt the RRC re-setup, the RLF-related measurement information reported by the UE and an identifier which indicates that it is the second part of the RLF indication; and 5) after receiving the RLF indication message transmitted from the base station 3, the base station 1 utilizes one or more items selected from the C-RNTI and PCI, the MAC-I, and the ECGI of the Cell 1 included in the RLF indication message to perform verification, so as to confirm whether this RLF indication message is the second part of the RLF indication that is transmitted from the base station 1 to the base station 2, for example, confirming that it is the same UE by verification; if so, the RLF indication message, as the second part of the RLF indication that is transmitted from the base station 1 to the base station 2, is transmitted to the base station 2; after receiving the second RLF indication message, the base station 2 judges whether it is a handover parameter problem or a covering problem according to the RLF-related measurement information included therein; for example, when the signal quality of both a serving cell and the best neighboring cell is poor, it indicates there may be a coverage hole existing.

Furthermore, the base station 3 can send the RLF indication message to the base station 2 through the PCI information, which the UE includes in the RRC re-setup request message, in the UEInformationResponse message. After receiving the second RLF indication message, the base station 2 obtains UE context by matching according to the PCI and the C-RNTI, and the UE context can be verified through the short MAC-I, and further through the ECGI of the Cell 1. When the UE context is consistent with that in the RLF indication message received before, then the base station 2 regards the received second RLF indication message as the second part of RLF indication messages. The base station 2 judges whether it is a handover parameter problem or a covering problem according to the RLF-related measurement information in the RLF indication message. For example, when the signal quality of both a serving cell and the best neighboring cell is poor, it indicates there may be a coverage hole existing.

Figure 5:
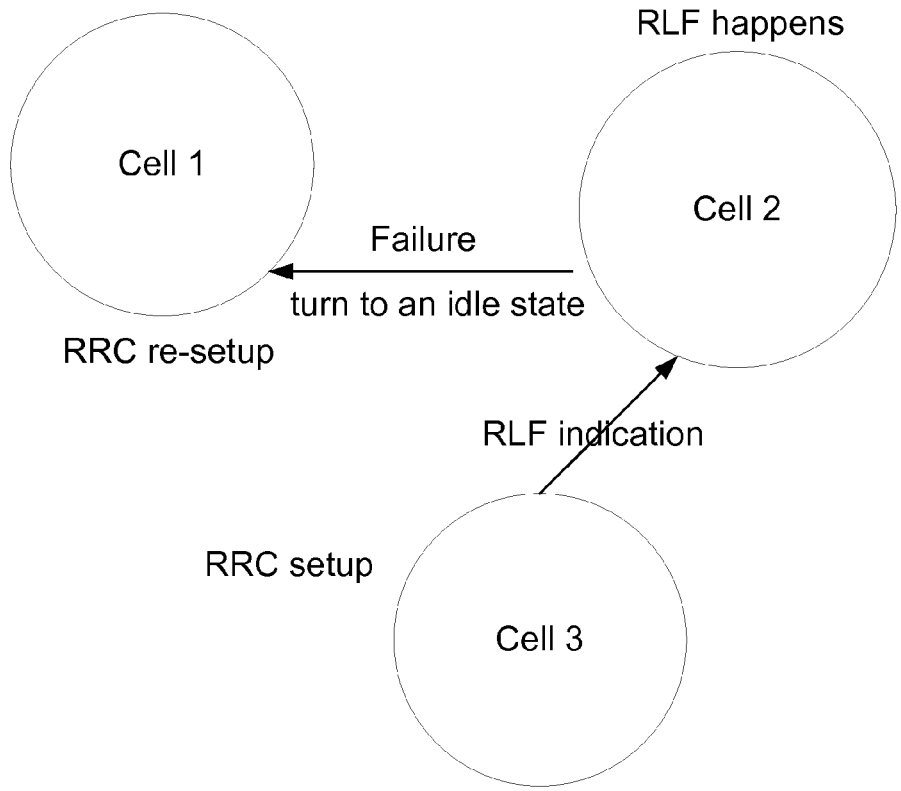
FIG. 5 shows a state diagram of judgment method 2.

Embodiment 3:

A method 2 of a handover scenario judgment is adopted, and an RRC setup complete message includes the ECGI of the Cell 1. With reference to the state diagram shown in FIG. 5, the embodiment 3 is described as follows:

1) UE is in connection state in the Cell 2 of the base station 2, RLF happens due to very bad radio link signal quality, handover failure or other reasons; the UE selects to perform RRC re-setup in the Cell 1, and sends an RRC re-setup request message to the base station 1; since there is no UE context in the Cell 1 or due to other reasons, the RRC re-setup performed by the UE in the Cell 1 is failed, and then the UE turns to an idle state; or the UE selects the Cell 1, and directly turns to the idle state without initiating an RRC re-setup request, for example, the Cell 1 is the one among systems; the UE in the idle state selects the Cell 3 through cell selection, sends an RRC setup request message to the base station 3, and initiates an RRC setup request in the Cell 3, then the UE performs RRC setup successfully and turns to the connection state;

2) the base station 3 receives an RRC setup complete message from the UE, wherein the RRC setup complete message contains the PCI, C-RNTI and short MAC-I which compose the RRC re-setup request message; the PCI is the PCI of the Cell 2, the C-RNTI and the short MAC-I are the ones related to the UE in the Cell 2; The RRC setup complete message can also include an indication indicating that the UE stores RLF-related measurement information, the ECGI of the Cell 1 where the UE attempts RRC re-setup for the first time after the RLF, the time difference between the UE performs a handover to the Cell 2 successfully and the UE attempts to initiate the RRC re-setup in the Cell 1, and the ECGI of a cell where the UE stayed prior to entering the Cell 2, for example, the ECGI of the Cell 4; the base station 3 sends a UEInformationRequest message to the UE to request it to report the RLF-related measurement information, and then the UE reports the RLF-related measurement information to the base station 3 through a UEInformationResponse message;

3) the base station 3 sends an RLF indication message to the base station 2 through the PCI of the Cell 2, wherein the RLF indication message here includes the C-RNTI and PCI, and it can also include short MAC-I, the ECGI of the Cell 1 which is selected by the UE to attempt the RRC re-setup, the RLF-related measurement information reported by the UE, the time difference between the UE performs a handover to the Cell 2 and the UE attempts to initiate the RRC re-setup in the Cell 1, and the ECGI of the cell where the UE stayed prior to entering the Cell 2;

4) after receiving the RLF indication message, the base station 2 obtains specific UE context by matching according to the C-RNTI and PCI and furthermore, the UE context can be verified through the short MAC-I; the base station 2 on a network side can judge a specific handover scenario according to the timer of the UE context and the time difference between the UE performs a handover to the Cell 2 and the UE attempts to initiate the RRC re-setup in the Cell 1; for example, when the timer of the UE context indicates a value smaller than the time difference, then judging this handover from the Cell 2 to the Cell 1to be a too late handover; when the timer of the UE context indicates a value larger than the time difference, and the source cell where the UE performs a handover last time is the Cell 1, then judging this handover from the Cell 1 to the Cell 2 to be a too early handover; and when the timer of the UE context indicates a value larger than the time difference, and the source cell where the UE performs a handover last time is Cell 4 which serves as the other cell, then judging this handover from the Cell 4 to the Cell 2 to be a handover to a wrong cell; and 5) the base station 2 can also judge whether it is a handover parameter problem or a covering problem according to the RLF-related measurement information in the RLF indication message; for example, if the signal quality of both a serving cell and the best neighboring cell is poor, it indicates there may be a coverage hole existing.

Embodiment 4:

The method 2 of a handover scenario judgment is adopted, and a UEInformationResponse message includes the ECGI of the Cell 1. With reference to the state diagram shown in FIG. 5, the embodiment 4 is described as follows:

1) UE is in connection state in the Cell 2 of the base station 2, RLF happens due to very bad radio link signal quality, handover failure or other reasons; the UE selects to perform RRC re-setup in the Cell 1, and sends an RRC re-setup request message to the base station 1; since there is no UE context in the Cell 1 or due to other reasons, the RRC re-setup performed by the UE in the Cell 1 is failed, and then the UE turns to an idle state; or the UE selects the Cell 1, and directly turns to the idle state without initiating an RRC re-setup request, for example, the Cell 1 is the one among systems; the UE in the idle state selects the Cell 3 through cell selection, sends an RRC setup request message to the base station 3, and initiates an RRC setup request in the Cell 3, then the UE performs the RRC setup successfully and turns to the connection state;

2) the base station 3 receives an RRC setup complete message from the UE, wherein the message includes an indication indicating that the UE stores RLF-related measurement information, and sends a UEInformationRequest message to the UE to request it to report the RLF-related measurement information, and then the UE reports the RLF-related measurement information to the base station 3 through a UEInformationResponse message; the UEInformationResponse message includes the PCI, C-RNTI and short MAC-I which compose the RRC re-setup request message, wherein the PCI is the PCI of the Cell 2; the C-RNTI and the short MAC-I are the ones related to the UE in the Cell 2; the UEInformationResponse message can also include the ECGI of the Cell 1 where the UE attempts RRC re-setup for the first time after the RLF, the time difference between the UE performs a handover to the Cell 2 and the UE attempts to initiate the RRC re-setup in the Cell 1, and the ECGI of a cell where the UE stayed prior to entering the Cell 2;

3) the base station 3 sends an RLF indication message to the base station 2 through the PCI of the Cell 2, wherein the RLF indication message here includes the C-RNTI and PCI in the RRC re-setup complete message, and it can also include short MAC-I, the ECGI of the Cell 1 which is selected by the UE to attempt the RRC re-setup, the RLF-related measurement information reported by the UE, the time difference between the UE performs a handover to the Cell 2 and the UE attempts to initiate the RRC re-setup in the Cell 1, and the ECGI of the cell where the UE stayed prior to entering the Cell 2;

4) after receiving the RLF indication message, the base station 2 obtains specific UE context by matching according to the C-RNTI and PCI, and furthermore, the UE context can be verified through the short MAC-I; the base station 2 can judge a specific handover scenario according to the timer of the UE context and the time difference reported by the UE, wherein the timer of the UE context is on a network side and provides a time threshold for a handover scenario judgment, and the time difference reported by the UE is the difference of time between the UE performs a handover to the Cell 2 and the UE attempts to initiate the RRC re-setup in the Cell 1.

For example, when the timer of the UE context indicates a value smaller than the time difference, then judging the handover from the Cell 2 to the Cell 1 to be a too late handover; when the timer of the UE context indicates a value larger than the time difference, and the source cell where the UE performs a handover last time is the Cell 1, then judging the handover from the Cell 1 to the Cell 2 to be a too early handover; and when the timer of the UE context indicates a value larger than the time difference, and the source cell where the UE performs a handover last time is Cell 4 which serves as other cell, then judging the handover from the Cell 4 to the Cell 2 to be a handover to a wrong cell; moreover, the ECGI of the cell, i.e. the Cell 4, where the UE stayed prior to entering the Cell 2 can be obtained from the RLF indication message; and 5) the base station 2 can also judge whether it is a handover parameter problem or a covering problem according to the RLF-related measurement information in the RLF indication message; for example, when the signal quality of both a serving cell and the best neighboring cell is poor, it indicates there may be a coverage hole existing.

The RLF-related measurement information in the embodiments above is one or more items in the following items: measurement results of signal quality of a serving cell and the best neighboring cell before the happening of RLF, measurement results of signal quality of a serving cell and the best neighboring cell, which are measured by the UE when initiating re-setup subsequently, and position information of UE.

For implementing the above-mentioned method, the disclosure provides a system for a handover scenario judgment, including: a judging unit, which is configured to, in the case that the UE includes an ECGI in an uplink message, make a handover scenario judgment based on the ECGI. The uplink message is a message that includes RLF-related measurement information, or a message that includes an indication of RLF-related measurement information.

In the system above, the judging unit is further configured to make the handover scenario judgment based on an ECGI of a cell where the UE attempts the first RRC re-setup in the case that the ECGI is the ECGI of the cell where the UE attempts the first RRC re-setup when the message that includes RLF-related measurement information is a UEInformationResponse message, or the message that includes an indication of RLF-related measurement information is an RRCsetupcomplete message.

In the system above, the judging unit is further configured to make a judgment on sending of an RLF indication message based on the ECGI of the cell where the UE attempts the first RRC re-setup.

In the system above, the judging unit is further configured to make the handover scenario judgment based on an ECGI of a cell where the UE stayed prior to entering the cell where RLF happens, in the case that the ECGI is the ECGI of the cell where the UE stayed prior to entering the cell where RLF happens when the message that includes RLF-related measurement information is a UEInformationResponse message, or the message that includes an indication of RLF-related measurement information is an RRCsetupcomplete message.

For implementing the above-mentioned method, an embodiment of the disclosure provides UE for a handover scenario judgment, including:

a collecting unit, which is configured to collect an uplink message; and a reporting unit, which is configured to report an uplink message which includes an ECGI to a base station on a network side;

the above-mentioned uplink message is a message that includes RLF-related measurement information, or a message that includes an indication of RLF-related measurement information.

The above-mentioned UE is further configured to: initiate RRC setup in Cell 3 successfully, after radio link failure happens in the Cell 2 and the UE has failure in RRC re-setup in the Cell 1; and include ECGIs of Cell 1 and the Cell 2, the time difference between the UE performs a handover to the Cell 2 and the UE initiates an RRC re-setup request in the Cell 1, and/or an ECGI of a cell where the UE stayed prior to entering the Cell 2 in an uplink message transmitted by the UE to a base station to which the Cell 3 belongs.

Here, the RLF-related measurement information includes any one or a combination of at least two of the following information:

information 1: measurement results of signal quality of a serving cell and the best neighboring cell before the happening of RLF;

information 2: measurement results of signal quality of a serving cell and the best neighboring cell, which are measured by the UE when initiating re-setup subsequently; and information 3: position information of UE.

In addition, the embodiment of the disclosure further provides a base station for a handover scenario judgment, including:

a judging unit, which is configured to make a handover scenario judgment according to an uplink message that is reported by UE and includes an ECGI;

the above-mentioned uplink message is a message that includes RLF-related measurement information, or a message that includes an indication of RLF-related measurement information.

Here, the judging unit is further configured to make the handover scenario judgment based on an ECGI of a cell where the UE attempts the first RRC re-setup, in the case that the ECGI is the ECGI of the cell where the UE attempts the first RRC re-setup when the message that includes RLF-related measurement information is a UEInformationResponse message, or the message that includes an indication of RLF-related measurement information is an RRCsetupcomplete message.

The judging unit is further configured to judge sending of an RLF indication message based on the ECGI of the cell where the UE attempts the first RRC re-setup, so as to realize accurate sending of the RLF indication message.

The judging unit is further configured to make the handover scenario judgment based on an ECGI of a cell where the UE stayed prior to entering a cell where RLF happens, in the case that the ECGI is the ECGI of the cell where the UE stayed prior to entering the cell where RLF happens when the message that includes RLF-related measurement information is a UEInformationResponse message, or the message that includes an indication of RLF-related measurement information is an RRCsetupcomplete message.

The base station further includes a transmission unit, which is configured to include the ECGI of the cell where the UE attempts the first RRC re-setup and/or the ECGI of the cell where the UE stayed prior to entering the cell where RLF happens in an RLF indication message transmitted between the base stations; the transmission between the base stations is that the message is transmitted from the base station which receives the RLF-related measurement information of the UE to the base station to which a serving cell where the UE stayed before the happening of RLF belongs.

The judging unit is further configured to:

when the timer of the UE context indicates a value smaller than the time difference reported by the UE, judge that this handover is a too late handover scenario; when the timer of the UE context indicates a value larger than the time difference reported by the UE, and a source cell where the UE performs a handover last time is a cell where the UE performs RRC re-setup, judge that this handover is a too early handover scenario; and when the timer of the UE context indicates a value larger than the time difference reported by the UE, and the source cell where the UE performs a handover last time is other cell, judge this handover to be a handover to a wrong cell;

the above-mentioned timer of the UE context is on a network side, and provides a time threshold for the handover scenario judgment; and the time difference reported by the UE is the difference of time between the UE performs a handover to the Cell 2 and the UE attempts to initiate an RRC re-setup request in the Cell 1.

The above are only preferable embodiments of the present disclosure, and not used for limiting the scope of the claims of the present disclosure.

The invention claimed is:

1. A method for reporting a handover-scenario-judgment parameter by a User Equipment (UE), comprising: after a Radio Link Failure (RLF) happens to a UE in a cell 2, and a Radio Resource Control (RRC) re-setup attempt of the UE in a Cell 1 after the RLF fails or aborts, initiating, by the UE, an RRC setup request in a Cell 3 by sending an RRC setup request message to a base station 3 managing the cell 3;

upon successful RRC setup in the cell 3, including, by the UE, an Evolved Cell Global Identifier (ECGI) of the cell 1 and/or an ECGI of a source cell where the UE stayed before staying in the cell 2 in an uplink message; and transmitting the uplink message to the base station 3, wherein the uplink message is a message containing measurement information related to the RLF or a message containing an indication of measurement information related to the RLF, including, by the base station 3, in an RLF indication message, the ECGI of the cell 1 and/or the ECGI of the source cell where the UE stayed before staying in the cell 2; and transmitting the RLF indication message to a base station 2 managing the cell 2, such that the base station 2 makes a handover scenario judgment based on the RLF indication message.

2. The method according to claim 1, wherein when the message containing the measurement information related to the RLF is a UE information response (UEInformationResponse) message or the message containing the indication of the measurement information related to the RLF is a Radio Resource Control (RRC) setup complete (RRCsetupcomplete) message, the ECGI is the ECGI of the cell 1, and the judgment comprises: making a handover scenario judgment based on the ECGI of the cell 1.

3. The method according to claim 2, wherein the judgment further comprises: making a judgment on sending of an RLF indication message based on the ECGI of the cell 1.

4. The method according to claim 1, wherein when the message containing the measurement information related to the RLF is a UEInformationResponse message or the message containing the indication of the measurement information related to the RLF is an RRCsetupcomplete message, the ECGI is the ECGI of the source cell where the UE stayed before staying in the cell 2, and the judgment comprises: making a handover scenario judgment based on the ECGI of the source cell where the UE stayed before staying in the cell 2.

5. The method according to claim 1, wherein the base station 2 makes a handover scenario judgment by:

determining that there is a too-late handover from the cell 2 to the cell 1 when a timer value of UE context is smaller than a time period reported by the UE; or determining that a last handover to the cell 2 is a too-early handover when a timer value of UE context is larger than a time period reported by the UE, and the source cell of the last handover is the cell 1; or determining that a last handover to the cell 2 is a handover to a wrong cell when a timer value of UE context is larger than a time period reported by the UE, and the source cell of the last handover is a cell 4 other than the cell 1 and the cell 2, wherein the timer value of the UE context is at a network side, and provides a time threshold for the handover scenario judgment; and the time period reported by the UE is a time period since the last handover of the UE to the cell 2 till the RRC re-setup attempt by the UE in the Cell 1.

6. A method for reporting a handover-scenario-judgment parameter by a User Equipment (UE), comprising: after a Radio Link Failure (RLF) happens to a UE in a cell 2, and a Radio Resource Control (RRC) re-setup attempt of the UE in a Cell 1 after the RLF fails or aborts, initiating, by the UE, an RRC setup request in a Cell 3 by sending an RRC setup request message to a base station 3 managing the cell 3;

upon successful RRC setup in the cell 3, including, by the UE, in an uplink message, Evolved Cell Global Identifiers (ECGIs) of the Cell 1 and the Cell 2, a time period since a last handover of the UE to the cell 2 till the RRC re-setup attempt in the Cell 1, and/or an ECGI of a source cell where the UE stayed before staying in the Cell 2; and transmitting the uplink message to the base station 3, wherein the uplink message is a message containing measurement information related to the RLF or a message containing an indication of measurement information related to the RLF, transmitting, by the base station 3, information reported by the UE to a base station 2 managing the cell 2, such that a handover scenario judgment is made based on the information reported by the UE.

7. The method according to claim 6, wherein the base station 2 compares a timer value of UE context with the time period;

it is determined that there is a too-late handover from the cell 2 to the cell 1 when the timer value of the UE context is smaller than the time period; or it is determined that the last handover to the cell 2 is a too-early handover when the timer value of the UE context is larger than the time period, and the source cell of the last handover is the cell 1; or it is determined that the last handover to the cell 2 is a handover to a wrong cell when the timer value of the UE context is larger than the time period, and the source cell of the last handover is a cell 4 other than the cell 1 and the cell 2, wherein the timer value of the UE context is at a network side, and provides a time threshold for a handover scenario judgment.

8. The method according to claim 6, wherein the base station 3 sends a UE information request (UEInformationRequest) message to request the UE to report the measurement information related to the RLF; and the UE reports a handover judgment parameter through a UE information response (UEInformationResponse) message.

9. A User Equipment (UE) for reporting a handover-scenario-judgment parameter, comprising:

a reporting unit configured for: reporting an uplink message to a base station 3 managing a cell 3 upon successful RRC setup in the cell 3, after a Radio Link Failure (RLF) happens to the UE in a cell 2, and a Radio Resource Control (RRC) re-setup attempt of the UE in a Cell 1 after the RLF fails or aborts, wherein the uplink message comprises Evolved Cell Global Identifiers (ECGIs) of the Cell 1 and the Cell 2, a time period since a last handover of the UE to the cell 2 till the RRC re-setup attempt in the Cell 1, and/or an ECGI of a source cell where the UE stayed before staying in the Cell 2; and is a message containing measurement information related to the RLF or a message containing an indication of measurement information related to the RLF.

10. A device for a handover scenario judgment at a base station, comprising a transmitting unit and a judging unit, wherein after a Radio Link Failure (RLF) happens to a User Equipment (UE) in a cell 2, and a Radio Resource Control (RRC) re-setup attempt of the UE in a Cell 1 after the RLF fails or aborts, the transmitting unit is configured for:

receiving, at a base station 3 managing a cell 3, an uplink message reported by the UE upon successful RRC setup in the cell 3, wherein the uplink message comprises an Evolved Cell Global Identifier (ECGI) of the cell 1 and/or an ECGI of a source cell where the UE stayed before staying in the cell 2, and comprises measurement information related to the RLF or an indication of measurement information related to the RLF;

including, in an RLF indication message, the ECGI of the cell 1 and/or the ECGI of the source cell where the UE stayed before staying in the cell 2; and transmitting the RLF indication message from the base station 3 to a base station 2 managing the cell 2;

and the judging unit is configured for: at the base station 2, making a handover scenario judgment according to information reported by the UE.

11. The device according to claim 10, wherein the judging unit is further configured, when the message containing the measurement information related to the RLF is a UE information response (UEInformationResponse) message or the message containing the indication of the measurement information related to the RLF is a Radio Resource Control (RRC) setup complete (RRCsetupcomplete) message, as well as the ECGI is the ECGI of the cell 1, to make the handover scenario judgment based on the ECGI of the cell 1.

12. The device according to claim 10, wherein the judging unit is further configured, when the message containing the measurement information related to the RLF is a UEInformationResponse message or the message containing the indication of the measurement information related to the RLF is an RRCsetupcomplete message, as well as the ECGI is the ECGI of the source cell where the UE stayed before staying in the cell 2, to make the handover scenario judgment based on the ECGI of the source cell where the UE stayed before staying in the cell 2.

13. The device according to claim 10, wherein the judging unit is configured for:

determining that there is a too-late handover from the cell 2 to the cell 1 when a timer value of UE context is smaller than a time period reported by the UE; or determining that a last handover to the cell 2 is a too-early handover when a timer value of UE context is larger than a time period reported by the UE, and the source cell of the last handover is the cell 1; or determining that a last handover to the cell 2 is a handover to a wrong cell when a timer value of UE context is larger than a time period reported by the UE, and the source cell of the last handover is a cell 4 other than the cell 1 and the cell 2, wherein the timer value of the UE context is at a network side, and provides a time threshold for the handover scenario judgment; and the time period reported by the UE is a time period since the last handover of the UE to the cell 2 till the RRC re-setup attempt by the UE in the Cell 1.

14. The method according to claim 7, wherein the base station 3 sends a UE information request (UEInformationRequest) message to request the UE to report the measurement information related to the RLF; and the UE reports a handover judgment parameter through a UE information response (UEInformationResponse) message.

* * * * *